UNITED STATES PATENT OFFICE.

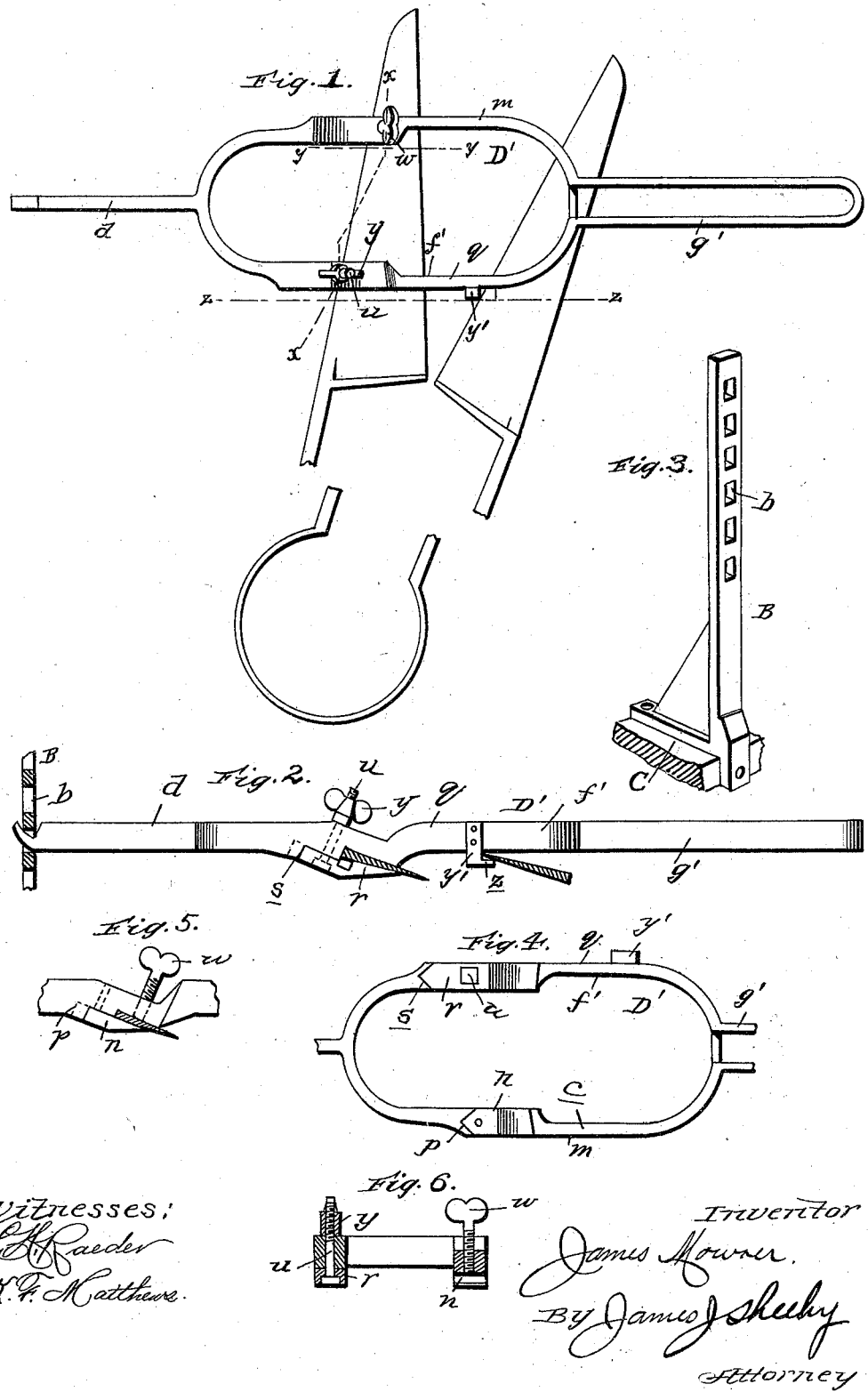

JAMES MOWRER, OF CASPER, WYOMING.

PLANE AND CHISEL GRINDER.

SPECIFICATION forming part of Letters Patent No. 550,635, dated December 3, 1895.

Application filed April 27, 1895. Serial No. 547,397. (No model.)

*To all whom it may concern:*

Be it known that I, JAMES MOWRER, a citizen of the United States, residing at Casper, in the county of Natrona and State of Wyoming, have invented certain new and useful Improvements in Plane and Chisel Grinders; and I do declare the following to be a full, clear, and exact description of the invention, such as will enable others skilled in the art to which it appertains to make and use the same.

My invention relates to improvements in devices for holding tools or implements, such as sheep-shearing tools, while they are being ground or sharpened; and its novelty and advantages will be fully understood from the following description and claims when taken in connection with the annexed drawings, in which—

Figure 1 is a plan view illustrating the holder of my improved device with a pair of shears secured in position. Fig. 2 is a section taken on the plane indicated by the line $z\,z$ of Fig. 1. Fig. 3 is a perspective view of the upright of the device, which is designed to be arranged on the frame of a grindstone or the like. Fig. 4 is a detail plan view of the holder in an inverted position; and Figs. 5 and 6 are detail sections taken in the planes indicated by the lines $y\,y$ and $x\,x$, respectively, of Fig. 1.

Referring by letter to the said drawings, B indicates the upright of my improved device. This upright is connected at its lower end to a base C, designed to be arranged on the frame of a grindstone, and it is provided at intervals in its length with apertures $b$, designed to receive the end of the tool-holder D', said plurality of apertures being provided in order to permit the tool-holder to be arranged at various distances above the base C to suit grindstones of various diameters.

The tool-holder D, as best shown in Figs. 1, 2, and 4 of the drawings, comprises the body $c$, which is provided with the reduced portion $d$ at one end, having its end shaped to enter the apertures of the upright B, and the reduced portion $g'$ at its opposite end, forming a convenient hand-grasp. The holder D' also comprises a loop $f$, and it is provided on the under side of one of the side bars $m$ of the loop $f'$ with a clip $n$, which is riveted or otherwise fixedly connected to said side bar and bears at one end against an angular shoulder formed thereon, as indicated by $p$, and is also provided on the under side of its other side bar $q$ with a movable clip $r$, which also has one of its ends arranged against an angular shoulder on the bar, as indicated by $s$. This movable clip $r$ is connected to a screw $u$, which extends loosely through the bar $q$ and is threaded to receive a wing-nut $y$, while the fixed clip $n$ is designed to serve in conjunction with a set-screw $w$, taking through the bar $m$ of the loop $f'$, as shown, for a purpose presently described.

$y$ indicates a piece of brass or other soft metal, which is connected to and depends from the bar $q$ of the loop $f$ and is provided at its lower end with a lip $z$, as shown. This piece $y$ is designed and adapted to hold one blade of a pair of shears while the other is being sharpened, and is made of soft metal, as above stated, in order not to injure the edge of said blade.

In using my improved device the blade to be sharpened is placed between the clips $n\,r$ and the bars of the loop $f$, as illustrated, and the screw $w$ is turned so as to bind the blade against the clip $n$, while the nut $u$ is turned to clamp the blade between the clip $r$ and the bar $q$. The other blade of the shears is placed in engagement with the piece $y$, by which it is securely held. When the shears have thus been placed and secured in the holder D', said holder is placed in engagement with the upright B, which, as before stated, is arranged on the frame of a grindstone, and through the medium of the holder the blade secured by the clips is pressed against the grindstone and sharpened. When one blade has been sharpened, the position of the shears in the holder may be conveniently reversed and the other blade sharpened, the sharpened blade being held and protected from injury by the soft-metal piece $y$.

I have in some respects specifically described the construction and relative arrangement of the parts of my improved device in order to impart a full and clear understanding of the same; but I do not desire to be understood as confining myself to such construction and arrangement, as such changes or modifications may be made in practice as fairly fall within the scope of my invention.

Having described my invention, what I claim is—

1. A device for holding tools while they are being sharpened, comprising an upright and a holder adapted to be connected or placed in engagement with the upright and having the fixed clip and the movable clip for engaging a blade of a pair of shears or the like and also having screws for binding the movable clip and the fixed clip against the blade and further having a soft metal piece $y$, adapted to engage and hold one blade while the other is being sharpened, substantially as specified.

2. A device for holding tools while they are being sharpened, comprising a holder having means for engaging and holding a blade of a pair of shears or the like and also having a device adapted to hold the other blade without dulling or injuring the edge thereof, substantially as specified.

In testimony whereof I affix my signature in presence of two witnesses.

JAMES MOWRER.

Witnesses:
JAMES ALMOND BAILEY,
JAMES HART.